US011389896B2

(12) United States Patent
Brown et al.

(10) Patent No.: US 11,389,896 B2
(45) Date of Patent: Jul. 19, 2022

(54) CALIBRATION TEST PIECE FOR GALVANOMETRIC LASER CALIBRATION

(71) Applicant: NLIGHT, INC., Vancouver, WA (US)

(72) Inventors: Aaron Brown, Vancouver, WA (US); Jay Small, Vancouver, WA (US); Robert J. Martinsen, West Linn, OR (US)

(73) Assignee: NLIGHT, INC., Camas, WA (US)

( * ) Notice: Subject to any disclaimer, the term of this patent is extended or adjusted under 35 U.S.C. 154(b) by 349 days.

(21) Appl. No.: 16/557,863

(22) Filed: Aug. 30, 2019

(65) Prior Publication Data

US 2020/0001396 A1    Jan. 2, 2020

Related U.S. Application Data

(63) Continuation-in-part of application No. 15/945,550, filed on Apr. 4, 2018, now Pat. No. 11,173,548.
(Continued)

(51) Int. Cl.
*B23K 26/082*    (2014.01)
*B23K 26/03*    (2006.01)
(Continued)

(52) U.S. Cl.
CPC .......... *B23K 26/082* (2015.10); *B23K 26/032* (2013.01); *B23K 26/042* (2015.10); *B23K 26/0736* (2013.01)

(58) Field of Classification Search
CPC .. B23K 26/082; B23K 26/032; B23K 26/042; B23K 26/0736; B23K 26/043; B23K 26/21; B23K 26/38; B23K 31/12
See application file for complete search history.

(56) References Cited

U.S. PATENT DOCUMENTS 5,832,415 A    11/1998  Wilkening et al.
11,135,680 B2 * 10/2021  Wuest .................. B23K 26/073
(Continued)

FOREIGN PATENT DOCUMENTS

WO    2009054811 A1    4/2009

OTHER PUBLICATIONS

European Patent Office, International Search Report and Written Opinion of the International Search Report in International Application No. PCT/US2019/049215, dated Nov. 26, 2019, 12 pages.
(Continued)

*Primary Examiner* — Nahida Sultana
(74) *Attorney, Agent, or Firm* — Schwabe Williamson & Wyatt (57) ABSTRACT

Some embodiments may include a galvanometric laser system, comprising: a laser device to generate a laser beam; an X-Y scan head module to position the laser beam on a work piece, the X-Y scan head module including a laser ingress to receive the laser beam and a laser egress to output the laser beam; a support platen located below the laser egress; an in-machine imaging system integrated with the galvanometric laser, wherein a camera of the in-machine imaging system is arranged to view a surface of an object located on the support platen using one or more optical components of the X-Y scan head module to generate assessment data associated with a calibration of the X-Y scan head module by imaging the surface of the object, wherein a calibration fiducial is located on the surface of the object.

20 Claims, 8 Drawing Sheets

Related U.S. Application Data (60) Provisional application No. 62/481,637, filed on Apr. 4, 2017, provisional application No. 62/818,624, filed on Mar. 14, 2019, provisional application No. 62/796,011, filed on Jan. 23, 2019.

(51) Int. Cl.
*B23K 26/042* (2014.01)
*B23K 26/073* (2006.01)

(56) References Cited

U.S. PATENT DOCUMENTS

| | | |
|---|---|---|
| 2004/0152233 A1 | 8/2004 | Nemets et al. |
| 2005/0067394 A1 | 3/2005 | Vaidyanathan et al. |
| 2005/0205778 A1 | 9/2005 | Kitai et al. |
| 2014/0327687 A1 | 11/2014 | Murakami |
| 2015/0253487 A1 | 9/2015 | Nichol et al. |
| 2015/0276783 A1 | 10/2015 | Palella et al. |
| 2015/0346483 A1 | 12/2015 | Ehrmann |
| 2018/0281067 A1 | 10/2018 | Small et al. |
| 2018/0326485 A1* | 11/2018 | Brown ............... B23K 26/0604 |
| 2019/0270161 A1* | 9/2019 | Allenberg-Rabe ... G02B 26/101 |
| 2020/0078884 A1* | 3/2020 | Nie ................... B23K 26/3576 |

OTHER PUBLICATIONS

European Patent Office, International Preliminary Report on Patentability International Application No. PCT/US2019/049215, dated Aug. 5, 2021, 7 pages.

* cited by examiner

CALIBRATION TEST PIECE FOR GALVANOMETRIC LASER CALIBRATION

RELATED APPLICATIONS

This application is a non-provisional of and claims priority benefit to U.S. provisional application Ser. No. 62/796,011, filed Jan. 23, 2019, and U.S. provisional application Ser. No. 62/818,624, filed on Mar. 14, 2019, and this application is a continuation in-part of U.S. non-provisional application Ser. No. 15/945,550, filed Apr. 4, 2018, which claims priority benefit to U.S. provisional application Ser. No. 62/481,637, filed on Apr. 4, 2017, all of which is incorporated by reference herein in its entirety.

TECHNICAL FIELD

The present disclosure relates to two-dimensional and three-dimensional galvanometric scanning systems.

BACKGROUND

Fiber lasers are widely used in industrial processes (e.g., cutting, welding, cladding, heat treatment, additive manufacturing, etc.) In some fiber lasers, the optical gain medium includes one or more active optical fibers with cores doped with rare-earth element(s). The rare-earth element(s) may be optically excited ("pumped") with light from one or more semiconductor laser sources.

Fiber laser systems may be used in laser processing machines. In one type of laser processing machine, both the laser source and the work piece are stationary and galvo (galvanometric) mirrors move the laser beam across a surface of the work piece.

In a 2D galvo system, an X-Y scan head module including two mirrors each rotatable by a galvanometric motor is located along a laser beam path between a laser device and a work piece to be laser processed, e.g., marked, cut, engraved, melted (for additive manufacturing) or the like, by the laser beam. The first galvanometric motor may operate to rotate its mirror to reposition the laser beam along the work piece with respect to a first axis (the X direction). The second galvanometric motor may operate to rotate its mirror to reposition the laser beam along the work piece with respect to a second orthogonal axis (the Y direction).

A 3D galvo system is similar, except that a dynamic focus module may be used in addition to the X-Y scan head module (say, along the light path between the X-Y scan head module and the laser device). In the dynamic focus module, one or more lenses move relative to the laser device to move a point of focus of the laser beam along a third axis (the Z direction) that is orthogonal to the first and second axes, which enables three dimensional laser processing (e.g., laser cutting) of the work piece.

In both 2D and 3D GSSs, precision movement of the mirrors is needed to ensure that the laser processes the work piece as intended. A validation may be performed at any time to check the "aim" of the laser system (whether the laser system marks a selected location on the work piece in response to a command to mark that selected location). Whereas a miscalibration of the mirrors may be exhibited by a laser mark that is "off target," a miscalibration of the dynamic focus module may be exhibited by poor mark quality. This is because the focus point that dynamically changes as the galvo points about the X-Y plane may be above or below and intended focus point, meaning the laser is not correctly focuses on the location to be processed (which may result in poor processing performance, and hence poor mark quality).

Some calibration may require the use of the GSS to mark a pattern on a work piece located on a support platen of the GSS. The marks on the work piece may be measured using an external imaging system (e.g., a separate CMM (coordinate measuring machine)) for comparison to the idealized location for the marks (and evaluation of mark quality in the case of calibrating a dynamic focus module).

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Instead of using an external CMM or other external imaging system to evaluate a marking on a work piece, an "in-machine" imaging system may be used to view a pattern projected onto a working plane as described in published U.S. Patent Application 2018/0281067, which is incorporated by reference herein in its entirety. By "in-machine," we mean an imaging system that views the pattern through optical components of the galvanometric laser (e.g., using the mirrors or other optical components of the X-Y scan head module and/or of a dynamic focus module). In these systems, imagery from the in-machine imaging system may be used to measure the difference in location between the projected pattern and the actual beam axis of the galvo. The '067 publication describes embodiments that include an optical fiducial pattern generator to project a transient optical fiducial on a laser processing target. This allows for calibraiton while a work piece is on the support platen (e.g., while powder material used in additive manufacturing is located on the support platen) because the transient optical fiducial may be projected onto the powder material. Some embodiments described herein may also may use an in-machine imaging system, but may use a non-transient calibration fiducial provided on a calibration test piece, instead of (or in addition to) use of the transient optical fiducial.

In one embodiment, a calibration test plate is placed onto the support platen to calibrate the GSS using the in-machine imaging system prior to placing a work piece on the support platen. In contrast to some CMM dependent calibration solutions that require evaluation of a mark on a work piece (paper, or flat metal plate) using an external CMM, the calibration test plate may not be marked at all (in fact, it may be possible and/or practical to perform calibration without even powering the laser source, let alone marking a work piece with a laser beam).

The calibration test piece may be any physical item having a surface (e.g., a planar surface) with one or more calibration fiducials usable by the in-machine imaging system to generate calibration data for calibrating the X-Y scan head module (these one or more calibration fiducials may span the span the field of the scanner area). The location of the features may be understood via pre-characterization. The imagery from the in-machine imaging system may be used to measure the difference in location between at least one of the calibration fiducials and the actual beam axis of the scanner. Once the X-Y difference is understood for multiple locations on the calibration test plate, calibration operations may be run without the need for an external CMM.

In some embodiments, the calibration test plate may include an internal light source to emit light to provide high-contrast, sharp-edged features in the imagery from the in-machine imaging system. Characteristics of the light source may be based on optical characteristics of optical components (e.g., mirrors, lens, a selective optic, etc.) along the light path between the calibration test plate and the in-machine imaging system (e.g., based on characteristics of optical components of the X-Y scan head module and/or the dynamic focus module). In other embodiments, the calibration test plate may not have an internal light source, but the surface on which the one or more calibration fiducials are located may have an optical feature to reflect light having characteristics based on characteristics of optical components along the light path between the calibration test plate and the in-machine imaging system, which may also provide high-contrast, sharp-edged features in the imagery from the in-machine imaging system.

The calibration test plate may include a locating feature to ensure repeatable location within the machine (e.g., a repeatable location on the support platen). The calibration test plate may be made from a material selected to be mechanically and thermally stable. In one embodiment, the calibration test plate may comprise glass with lithographed features, although many other options may be possible and practical. In another embodiment, the calibration test plate may comprise machined or etched metal or ceramic. In some embodiments, the calibration test plate may have plural layers (e.g., a glass layer with lithographed features, and a metal or some other support layer to provide rigidity to the glass layer or other top layer).

Some embodiments may utilize a pre-characterized calibration test plate and projection. The calibration test plate may be used prior to placing a work piece on the support platen. If the calibration of the X-Y scan head module is calibrated using the calibration test plate, then a work piece or other laser processing target may be placed on the support platen for laser processing thereof. Calibration may be performed one or more additional times, during laser processing, using an optical fiducial pattern generator, as described in the '067 publication.

Figure 1:
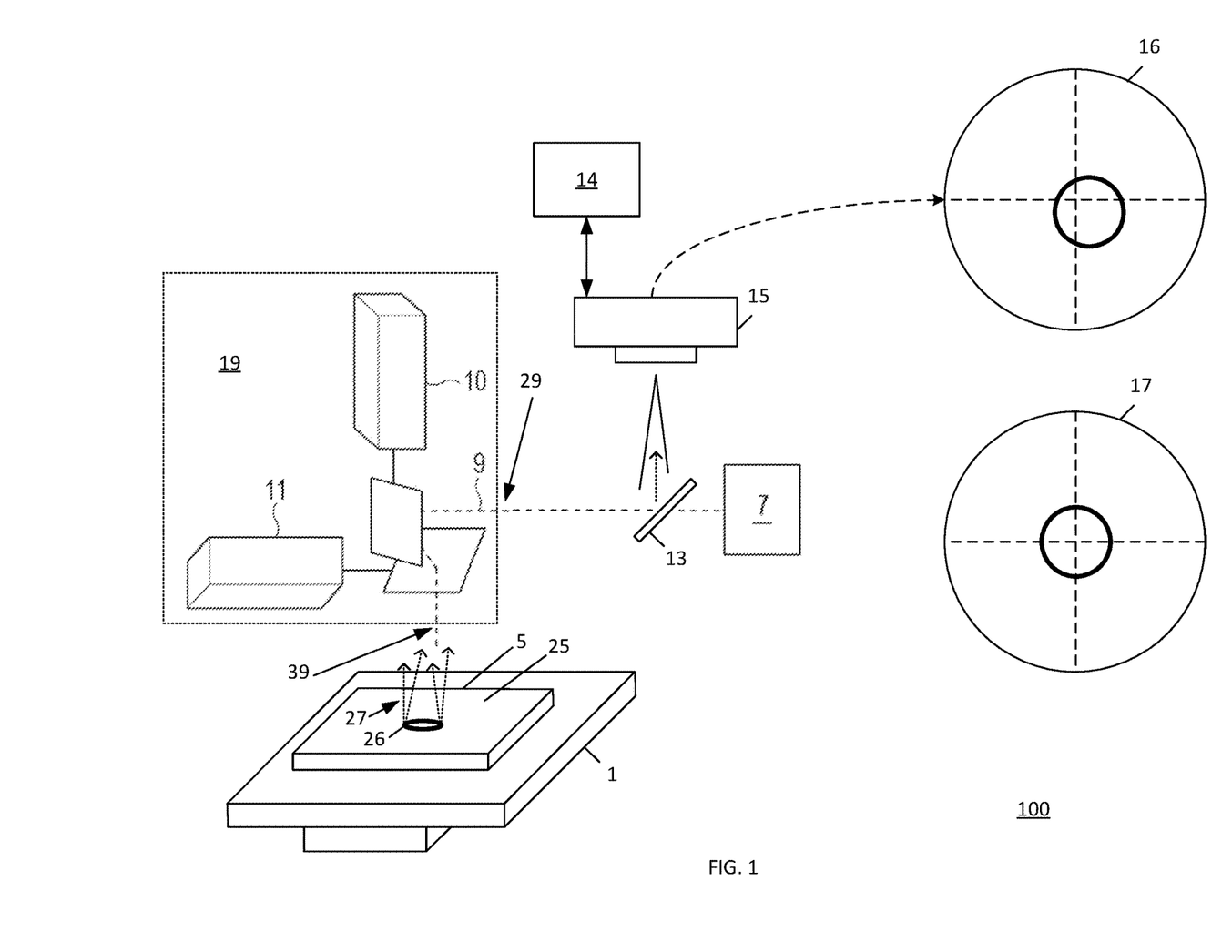
FIG. 1 illustrates a system including a two axis galvanometric laser and a calibration test plate, according to various embodiments.

FIG. 1 illustrates a system 100 including a two axis galvanometric laser and a calibration test plate 25, according to various embodiments. The two axis galvanometric laser includes a laser device 7 to generate a laser beam and an X-Y scan module 19 to move the laser beam relative to a work surface. The X-Y scan module 19 may include an X galvo motor 10 to drive rotation of a mirror and a Y galvo motor 11 to drive rotation of a mirror. The laser beam is not shown, but dashed line 9 shows a path that the laser beam travels through the system 100 (the X-Y scan module includes a laser ingress 29 to receive the laser beam and a laser egress 39 to output the laser beam to the work surface).

The calibration test plate 25 includes a first side to arranged to be placed on a support platen 1 of the system 100 during calibration (calibration may be performed prior to placing a work piece (not shown) on the support platen 1 for processing by the laser beam). In some embodiments, the first side (or some other portion of the calibration test plate 25) may include a guide for locating the calibration test plate 25 at the specific location on the support platen 1. A second opposite side of the calibration test plate 25 includes at least one calibration fiducial 26 usable by a camera 15 to generate calibration data for calibrating the X-Y scan head module 19. In some embodiments, the calibration fiducial 26 may have the same geometry as any of the patterns described in U.S. provisional application Ser. No. 62/818,624. While the '624 provisional describes marking the patterns on a work piece using a laser beam (the patterns described in the '624 provisional are laser marking artifacts)—different than imaging the calibration test plate 25 having calibration fiducials as described herein—there may be similar advantages to using the same geometry for the calibration fiducial 26. For instance, in some embodiments, a calibration fiducial 26 may be a polygon or an ellipse (e.g., a geopmetrically perfect circle or some other ellipse)—rather than intersecting line patterns such as a X pattern or a + pattern, although this is not required (in some embodiments, it may be possible or practical to use a pattern of intersecting lines for the calibration fiducial 26).

The calibration test plate 25 may include an optical feature to direct light 27 into the laser egress 39. Again, this may be at a time when the laser device 7 is not generating a laser beam (the calibration test plate 25 may be placed on the support platen 1 prior to placement of a work piece on the support platen 1 for laser processing of the work piece). The light 27 may have selected characteristics (e.g., a selected wavelength) that makes it possible for the light 27 to reach camera 15. In one embodiment, the laser beam may have a wavelength of 975 nm and the light 27 may also have a wavelength of 975 nm.

Some of the optical components along the path 9 are shown, others are not for the sake of brevity. For instance, the system may include a laser scan optic (not shown), which may be the first optical component that receives the light 27. U.S. Patent Application 2018/0281067 describes laser scan optics, and the system 100 may employ any laser scan optics described therein according to various embodiments. The laser scan optic may have one or more characteristics based on its function with respect to the laser beam (it may pass light only in a selected wavelength range). The selected characteristics of the light 27 may be based on the characteristic(s) of the laser scan optic, so that the laser can pass through the laser scan optic in the reverse direction through the rest of the X-Y scan module 19 to reach selective optic 13.

Selective optic 13 may be optically transmissive to the laser beam, but optically non-transmissive (e.g., reflective) to the light 27. The selected characteristics of the light 27 may also be based on characteristic(s) of the selective optic 13 so that the light 27 reaches the camera 15. In one example, the light 27 may be the same wavelength as the laser beam, but polarized differently than the laser beam so that it reflects from the selective optic 13 rather than passing through it as does the laser beam. U.S. Patent Application 2018/0281067 describes a selective optic, and the system 100 may employ any laser scan optics described therein according to various embodiments. Accordingly, the light 27 reaches the camera 15, which may sense the light 27 and generate an image 16 of the calibration test plate 25.

The image 16 is assessment data that, when displayed on an electronic display, may be evaluated by visual inspection by a person. For instance, an operator may measure a difference between a center of a geometric feature appearing in the assessment data (e.g., the representation of the calibration fiducial) and a reference (e.g., a center of the image 16, shown in the illustration as an intersection of the dash lines). The operator may determine whether the difference is greater than a preset threshold—if there is no difference, or the difference is minimal, the operator may validate the calibration of the X-Y scan head module. The validation may be recorded in a computer storage, such as a database, and/or recorded on some other medium (such as by initiating a label on the galvanometric laser, or some other means of recordation). For instance, by comparing image 16 to an idealized image 17 (an image generated by a perfectly calibrated X-Y scan head module), it is apparent than the image 16 shows miscalibration in both axes because the ellipse is offset horizontally and vertically.

In some embodiments camera-aided evaluation embodiment, the system 100 may also include one or more computing devices 14 each including at least one processor configured to execute instructions stored in a memory. The computing device(s) 14 may be in communication with any component of the system 100 to perform any calibration validation operations described herein. In embodiments including the imaging system, at least one of the computing devices may be a computing device of the imaging system, in communication with the camera 15 and including a processor programmed to perform any imaging system process described herein, including process 700 of FIG. 7, which will be described later in greater detail.

Referring again to FIG. 1, the light 27 may be reflected and/or emitted from the calibration test plate 25 based on the optical feature of the calibration test plate 25. In one example, the surface having the calibration fiducial is arranged to receive light from an ambient source, and reflect some of the ambient light (e.g., to direct light 27 into the laser egress). The reflectivity may be variable—with different reflectivity for the calibration fiducial 26 and the rest of the surface, which may provide high contrast in the image 16. In other examples, the calibration test plate 25 may include an on-board light source (e.g., an active calibration test plate 25) to generate the light 27. In yet other examples, the calibration test plate 25 may include one or more optically transmissive edges so that light generated by a light source external to the calibration test plate 25 may enter the calibration test plate 25 allowing the calibration test plate 25 to emit light 27 from the surface having the calibration fiducial 26.

Figure 2:
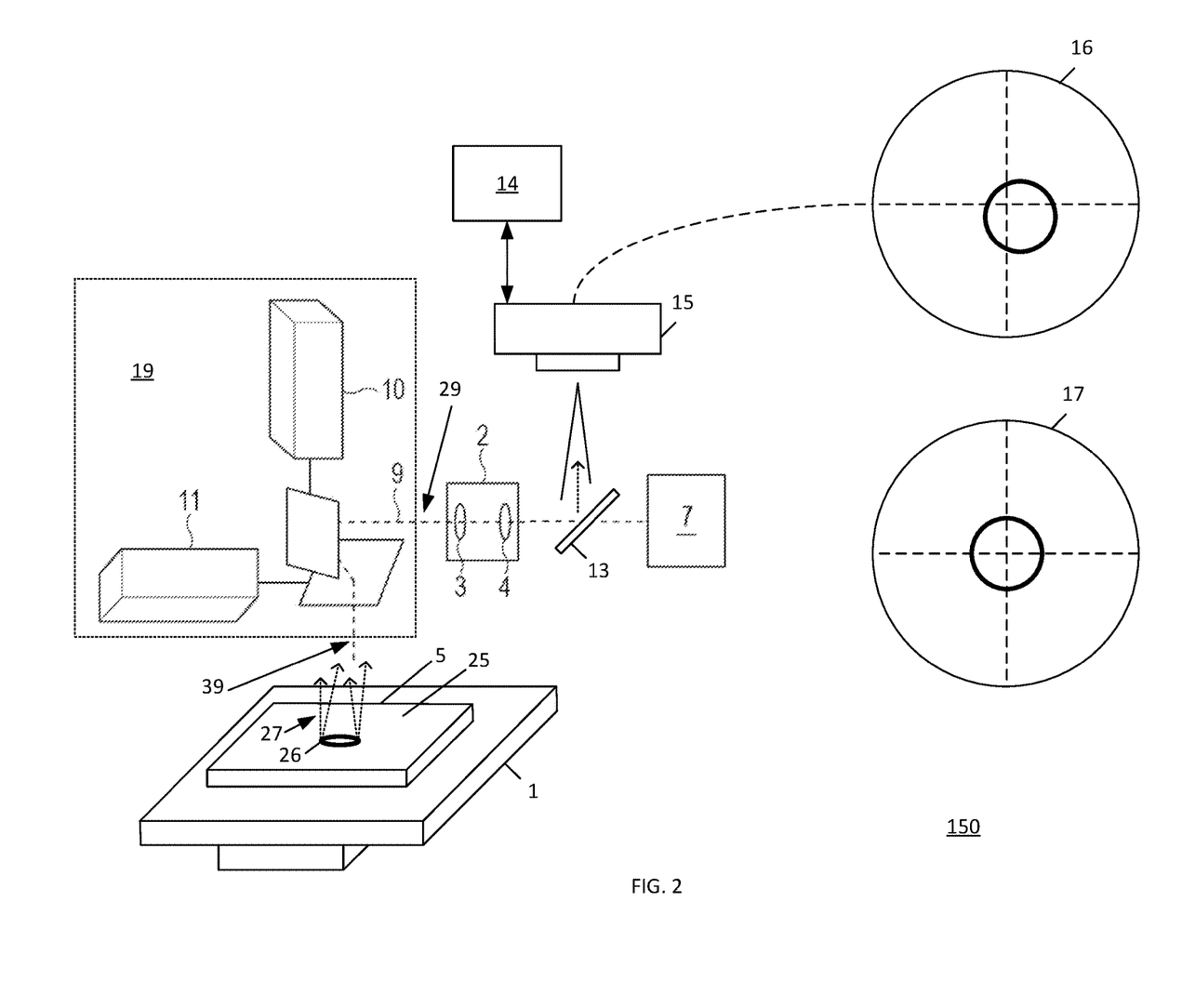
FIG. 2 illustrates a system including a three axis galvanometric laser and the calibration test plate of FIG. 1, according to various embodiments.

FIG. 2 illustrates a system 150 including a three axis galvanometric laser and the calibration test plate of FIG. 1, according to various embodiments. The system 150 may include all of the components of FIG. 1, and additionally may include a dynamic focus module 2 to synchronize movement of at least one lens relative to the laser device 7 with positioning of the laser beam by the X-Y scan head module 19. The dynamic focus module 2 may include lens 3 and 4, and the dynamic focus module 2 may control movement of these lens 3 and 4 relative to each other and/or the laser device 7 to change a point of focus of the laser beam. The light 27 may pass through the dynamic focus module 2 to reach the selective optic 13. The selected wavelength of the light 27 may be selected based on characteristics of the lens 3 and 4.

Figure 3A:
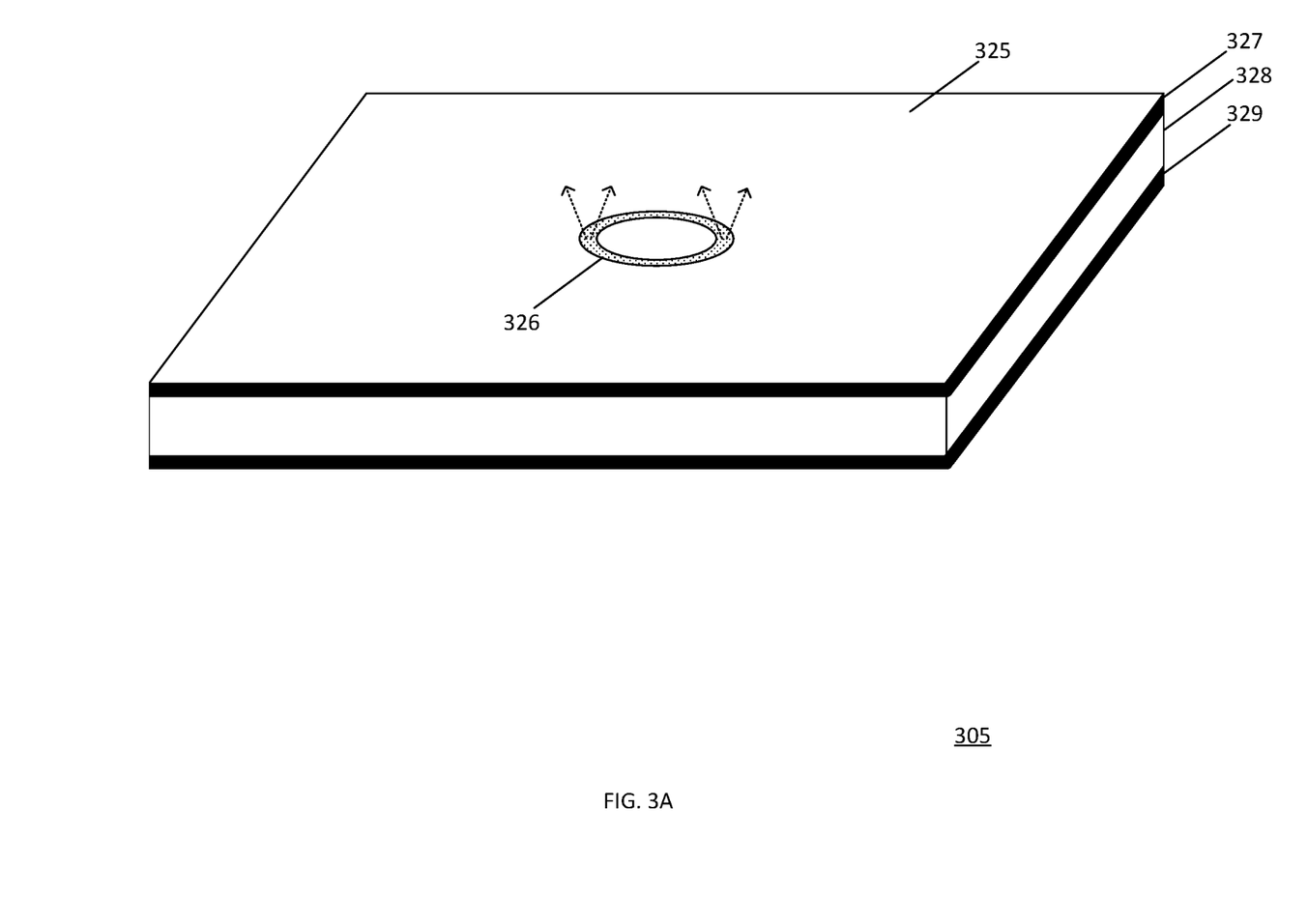
FIG. 3A illustrates a perspective view of a back-lit calibration test plate, according to various embodiments.

FIG. 3A illustrates a perspective view of a back-lit calibration test plate 305, according to various embodiments. The back-lit calibration test plate 305 may be used in the systems of FIG. 1 or 2 or any other galvanometric laser having an onboard camera. The calibration fiducial pattern 326 may have a geometry similar to the geometry of calibration fiducial 26 (FIGS. 1 and 2).

The calibration test plate 305 may include more than one layer of different materials. The calibration test plate 305 may include a first section 327 that may include a layer of glass, a second section 328 that may house a light source, and third support section 329 that may include a metal layer with a low coefficient of thermal expansion (such as invar) and/or high dimensional stability (such as steel).

An outside of the first section 327 may be selectively coated with an-optically non-transmissive coating. The selective coating may entirely cover the edges of the section 327 and also selectively cover the surface 325 (to form the calibration fiducial pattern 326, so that the calibration fiducial pattern 326 emits light generated from the light source). Also, the selective coating may be highly reflective on the inside of the coating to reflect light from the light source so that the reflected light also may be emitted from the calibration fiducial pattern 326 (and the selective coating may be applied to a top of the third section 329 and/or within the second section 328 for the same reason).

Figure 3B:
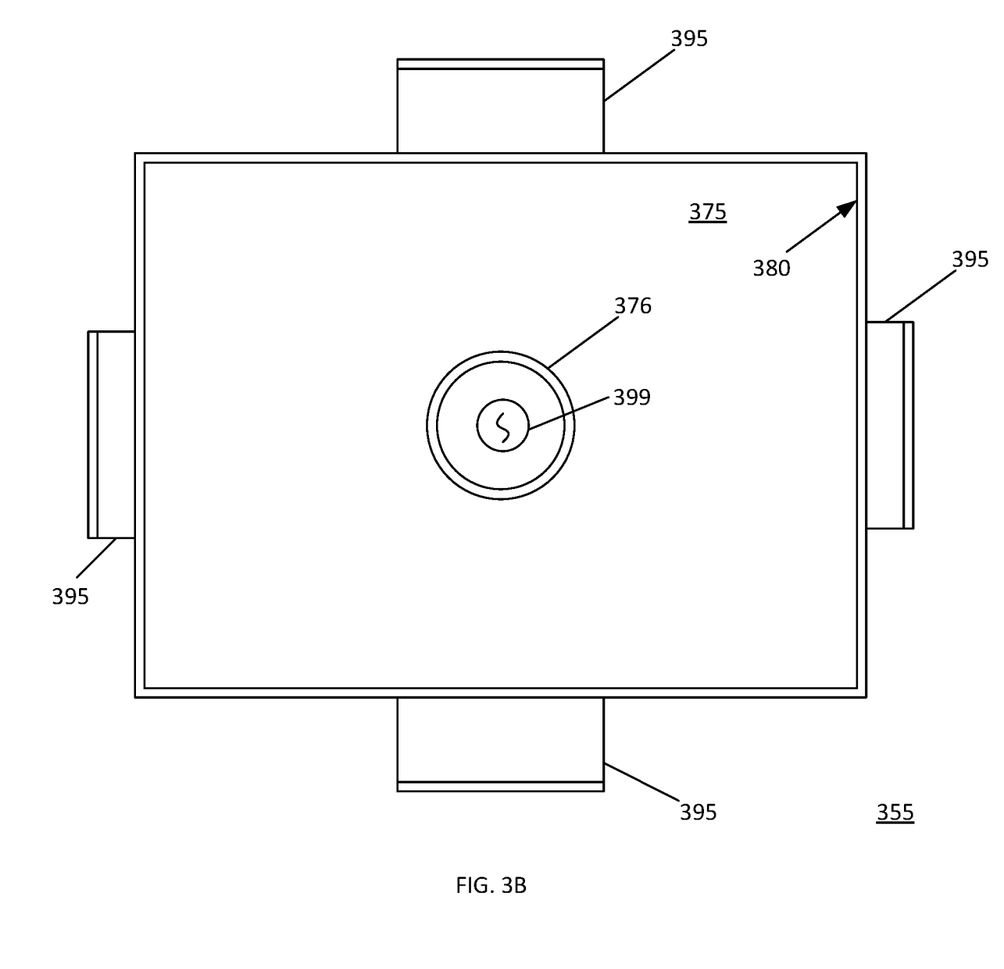
FIG. 3B illustrates a bottom view of a back-lit calibration test plate similar to the back-lit calibration test plate of FIG. 3A, according to various embodiments.

FIG. 3B illustrates a bottom view of a back-lit calibration test plate 355 similar to the back-lit calibration test plate of FIG. 3A (according to various embodiments). In this embodiment, the light housing section also serves as a support section to provide rigidity. The light source 399 may be located under a calibration fiducial pattern 376 (which may be similar to calibration fiducial pattern 326). In this view, an interior surface 380 of the sidewalls of the light housing section can be seen, as can an interior surface 375 of the top section. Any of these surfaces may include a reflective coating.

This embodiment also includes alignment brackets 395 to ensure repeatable location within the machine (e.g., a repeatable location on the support platen). In this embodiment, the alignment brackets 395 extend from each of the sidewalls of the light housing/support section. The alignment brackets 395 mount to edges of the support platen 1 (FIGS. 1 and 2) so calibration fiducial 376 is centered on the support platen 1. In other examples, a different locating feature can be used, for instance bumps or grooves on a bottom of a calibration test piece to mate with bumps or grooves on a support platen, and the locating feature may put the calibration fiducial 376 in some other location on the support platen (it need not necessarily need to be centered with the support platen as a whole).

Figure 4:
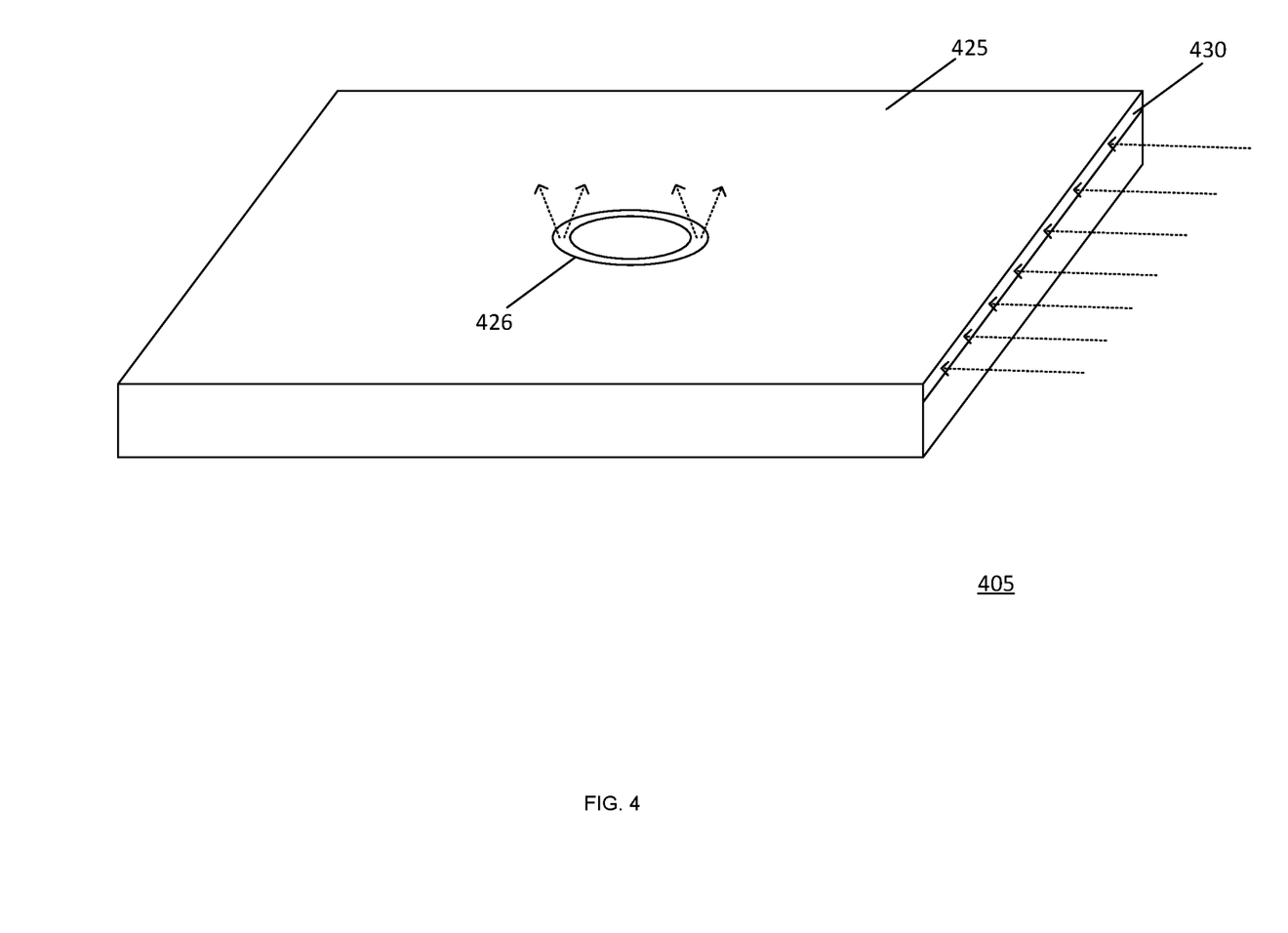
FIG. 4 illustrates a perspective view of an edge-lit calibration test plate, according to various embodiments.

FIG. 4 illustrates a perspective view of an edge-lit calibration test plate 405, according to various embodiments. This calibration test plate 405 may be similar to any of the other calibration test plates described herein, but this embodiment has a glass top layer with at least one exposed edge 430 (the optically non-transmissive coating is not applied to at least this edge). A light source is arranged to emit light into the exposed edge 430. The light travels inside the calibration test plate 405 (reflecting off interior surfaces) until it escapes from the calibration fiducial 426.

Figure 5:
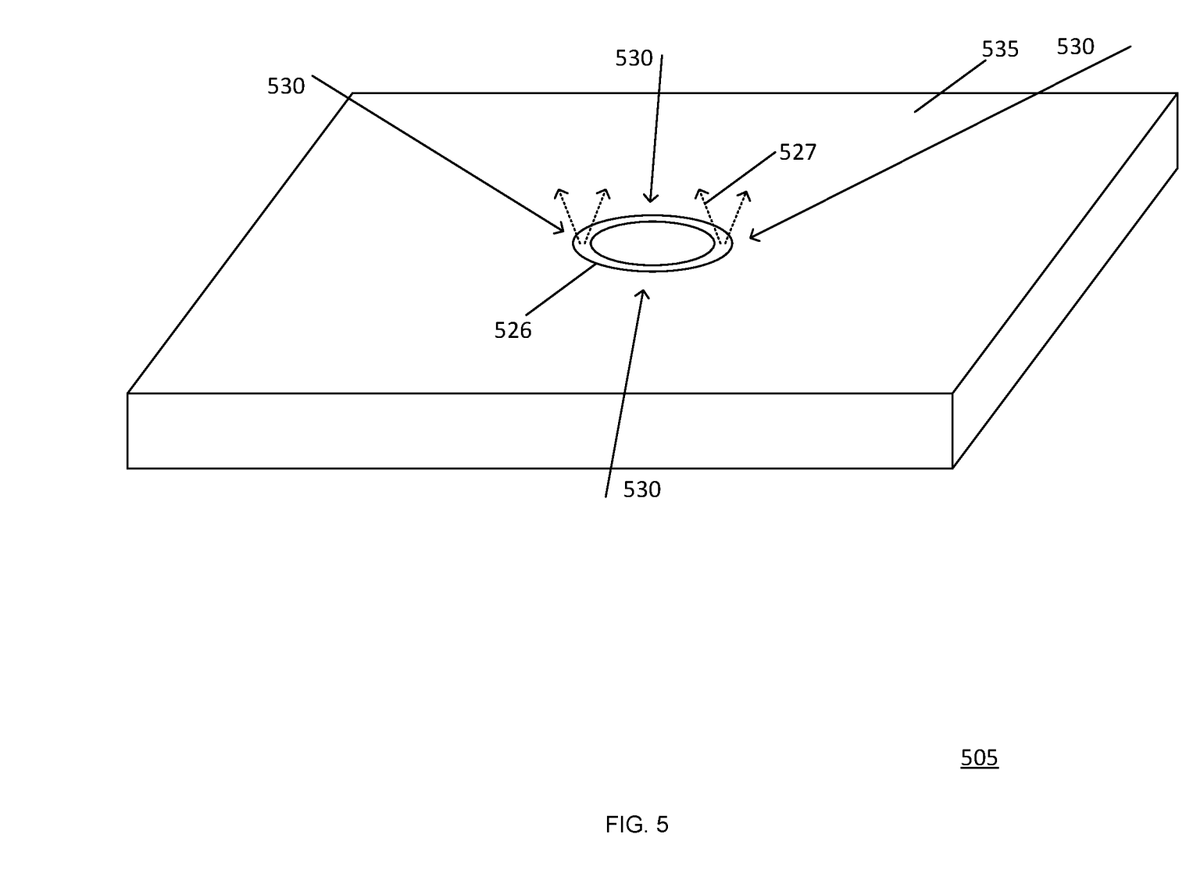
FIG. 5 illustrates a perspective view of calibration test plate with a reflective surface, according to various embodiments.

FIG. 5 illustrates a perspective view of a calibration test plate 505 with a reflective surface, according to various embodiments. In this example, the calibration fiducial 526 is reflective with a different reflectivity than the rest of the surface 535. The calibration fiducial 526 may be configured to reflect a portion of ambient light 530 to direct light 527 of a selected wavelength into a laser egress of an X-Y scan head module.

Figure 6:
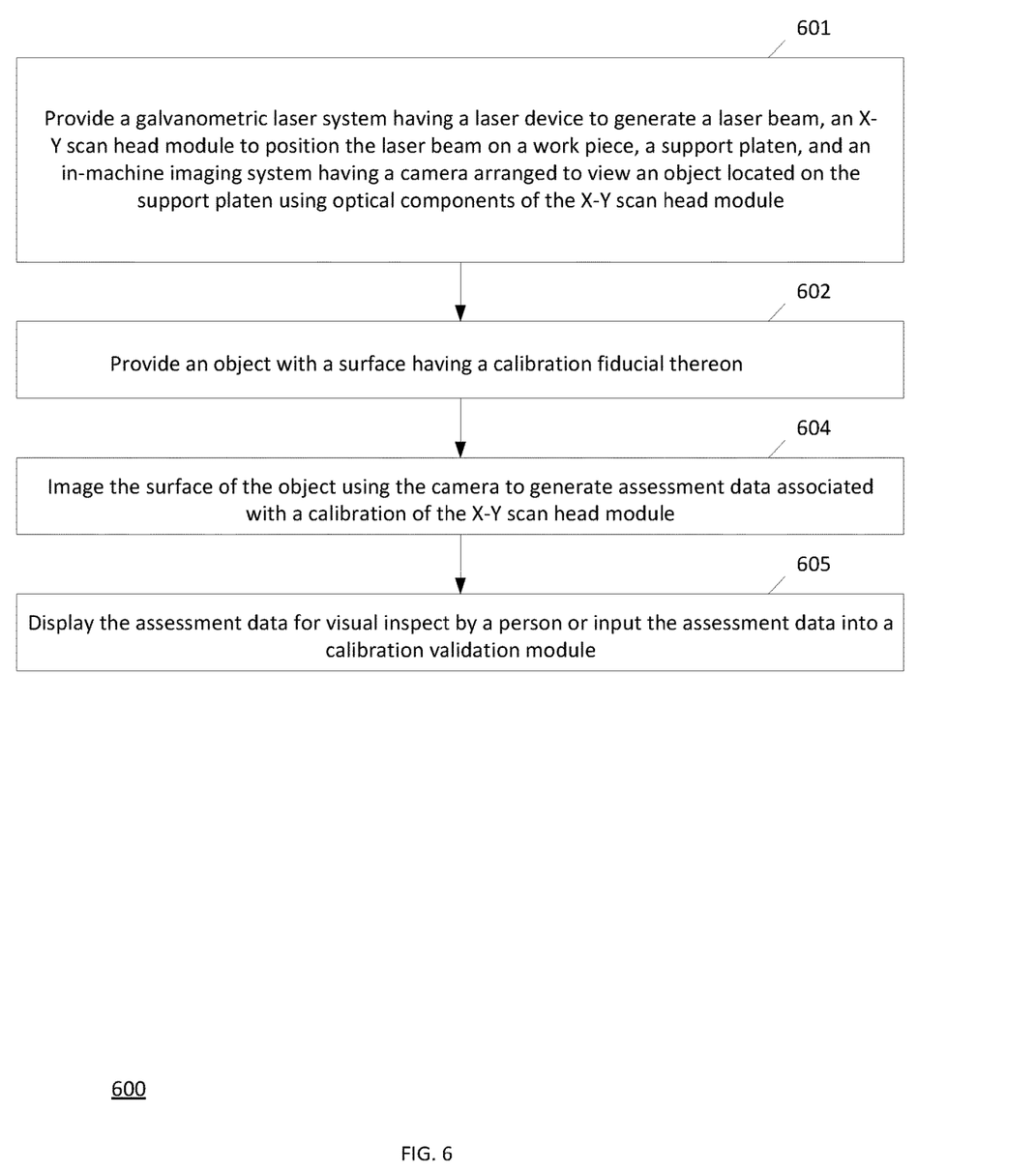
FIG. 6 illustrates a process of generating assessment data using an in-machine imaging system, according to various embodiments.

FIG. 6 illustrates a process 600 of generating assessment data using an in-machine imaging system, according to various embodiments. In block 601, a galvanometric laser system (e.g., a two or three axis galvanometric laser system) having a laser device to generate a laser beam, an X-Y scan head module to position the laser beam on a work piece, a support platen, and an in-machine imaging system having a camera arranged to view an object located on the support platen using optical components of the X-Y scan head module may be provided. The galvanometric laser system may have a dynamic focus module, in addition to the X-Y scan head module in some embodiments, and in these embodiments the camera may be arranged to view the object through additional optical components of the dynamic focus module.

In block 602, an object with a surface having a calibration fiducial thereon may be provided. The object may be a calibration test piece or the object may comprise a laser processing target. In the case that the object is a calibration test piece, the object may have any feature of any calibration test plate described in U.S. provisional application Ser. No. 62/796,011, filed Jan. 23, 2019 (or of any calibration test plate described herein), such as having a first side with a planar surface having the calibration fiducial etched thereon, lithographed thereon, or the like, and a second opposite side to place on the support platen (possibly with a locating feature and/or alignment feature on the second opposite side or some other side of the calibration test piece).

In the case that the object is a laser processing target, the calibration fiducial may be a transient calibration fiducial projected onto the surface of the object by an optical fiducial pattern generator as described in more detail in published U.S. Patent Application 2018/0281067 (U.S. non-provisional application Ser. No. 15/945,550, filed Apr. 4, 2018). In the case that the object comprises a calibration test piece, the calibration fiducial may be a non-transient calibration fiducial lithographed, etched, or the like, on a planar surface of the calibration test piece.

The transient or non-transient calibration fiducial may be a polygon or an ellipse, similar to any pattern described as laser-marked on a work piece in U.S. provisional application Ser. No. 62/818,624, filed on Mar. 14, 2019. Although the transient or non-transient calibration fiducial need not be laser-marked on a work piece, the use of the polygon or ellipse may still be effective for the transient or non-transient calibration fiducial, particularly where a computer-aided analysis of the assessment data is performed (a computer may identify the center of a polygon or ellipse more precisely than a center of intersecting lines, as described in the '624 provisional). However, transient or non-transient calibration fiducial may be intersecting lines or any other pattern, in other examples.

In block 604, the surface of the object may be imaged using the camera to generate assessment data associated with a calibration of the X-Y scan head module. In the case that the object is a calibration test piece, imaging may be perform placing a laser processing target on the support platen before placing the laser processing target on the support platen. In the case that the object is the laser processing target, the object may be imaged during laser processing (e.g., in between laser processing operations).

In block 605, the assessment data may be displayed (e.g., on a screen, printed, or the like) for visual inspection by a person (to determine whether the X-Y scan head module is calibrated within a threshold), or the assessment data may be input into a calibration validation module (for a computer-aided determination of whether the X-Y scan head module is calibrated within a threshold).

Figure 7:
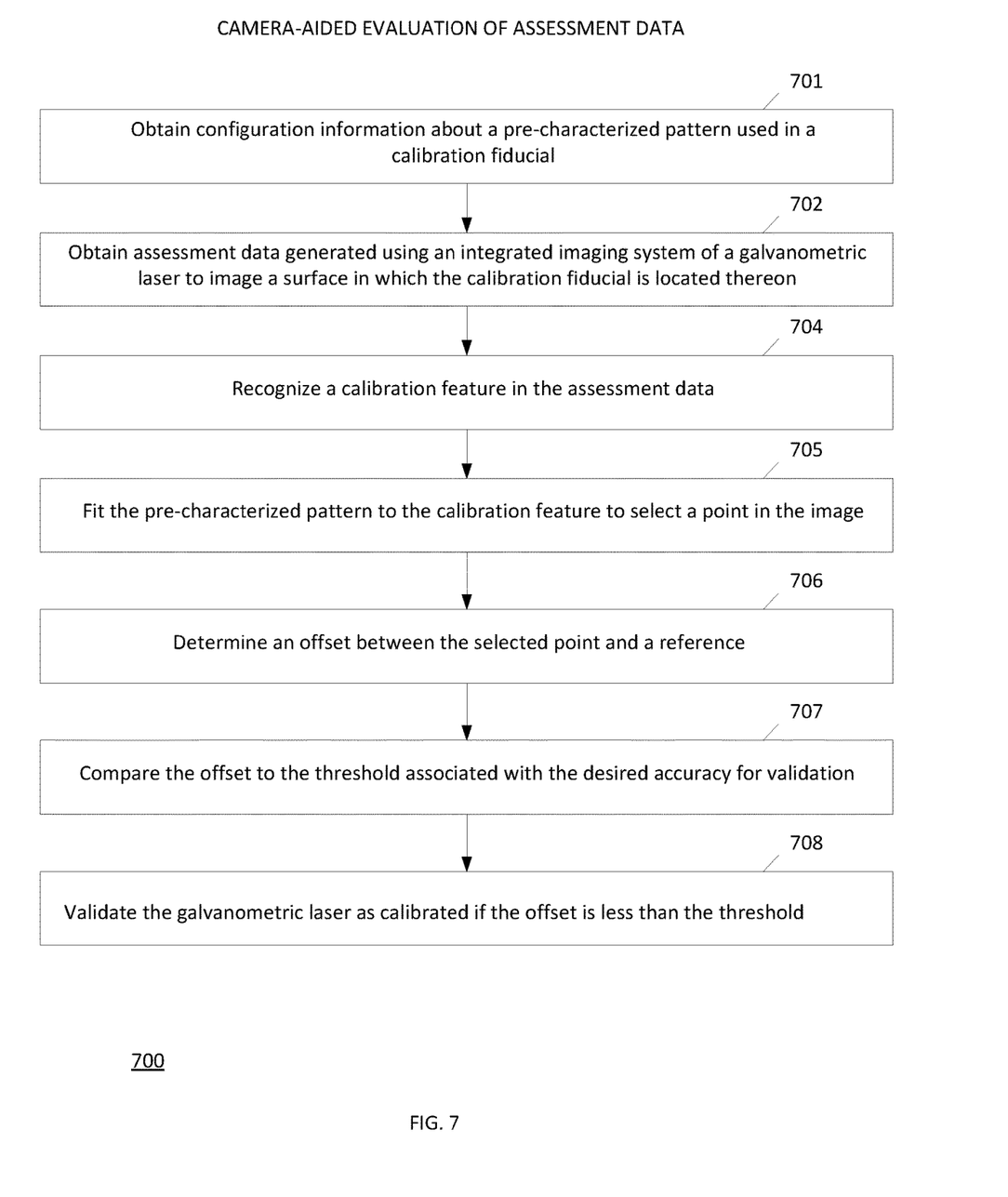
FIG. 7 illustrates a process of camera-aided evaluation of assessment data generating by imaging a calibration fiducial on a calibration test plate through an X-Y scan head module, according to various embodiments.

FIG. 7 illustrates a process 700 of camera-aided evaluation of assessment data generating by imaging a calibration fiducial on a calibration test plate through an X-Y scan head module (of a two or three axis galvanometric laser system), according to various embodiments. The process 700 may be performed on any assessment data described herein, including assessment data generated according to process 600 (FIG. 6). The process 700 may be performed by software of computing device 14 (FIG. 1). In block 701, the computing device may obtain configuration information about a pre-characterized pattern used in a calibration fiducial. In block 702, the computing device may obtain assessment data generated using an integrated imaging system of a galvanometric laser to image a surface in which the calibration fiducial is located thereon.

In block 704, the computing device may recognize a calibration feature in the assessment data. In block 705, the computing device may fit the pre-characterized pattern to the calibration feature to select a point in the image. In an example in which the calibration fiducial is an ellipse or a polygon, block 705 may include identifying a polygon or ellipse based on the calibration feature, e.g., by fitting a parametrically defined polygon or ellipse to the recognized calibration feature.

In block 706, the computing device may determine an offset between the selected point and a reference (e.g., a center of the scan image, or some other reference based on configuration data precharacterizing a location of the calibration test piece on the support platen). In block 707, the computing device may compare the offset to a threshold associated with the desired accuracy for validation. In block 708, the imaging system may validate the galvanometric laser (e.g., the X-Y scan head module) as calibrated if the offset is less than the threshold.

Most of the equipment discussed above comprises hardware and associated software. For example, the typical imaging system and/or galvanometric laser is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A galvanometric laser system, comprising:
a laser device to generate a laser beam;
an X-Y scan head module to position the laser beam on a work piece, the X-Y scan head module including a laser ingress to receive the laser beam and a laser egress to output the laser beam;
a support platen located below the laser egress and arranged to receive the work piece;
an in-machine imaging system integrated with the galvanometric laser system, wherein a camera of the in-machine imaging system is arranged to use one or more optical components of the X-Y scan head module to view an object located on the support platen; and
a light-emissive calibration test piece to place on the support platen during a calibration routine prior to positioning the laser beam on the work piece, the light-emissive calibration test piece with a planar surface including a first region and a second region having greater light transmissibility than the first region in which a calibration fiducial is located in the second region, the calibration fiducial usable by the camera to generate calibration data associated with a calibration of the X-Y scan head module.

2. The galvanometric laser system of claim 1, further comprising a selective optic located between the laser ingress and the laser device, the selective optic being optically transmissive to the laser beam and optically non-transmissive to light reflected or emitted from the light-emissive calibration test piece.

3. The galvanometric laser system of claim 1, wherein the light-emissive calibration test piece is arranged to emit light of a selected wavelength into the laser egress.

4. The galvanometric laser system of claim 1, wherein the calibration fiducial comprises a polygon or an ellipse.

5. The galvanometric laser system of claim 4, further comprising one or more processors coupled to the in-machine imaging system, the one or more processors configured to:
recognize a calibration feature in an image of the light-emissive calibration test piece, wherein the image is generated by the camera;
fit a polygon or an ellipse to the calibration feature; and
determine an offset between a center of the polygon or the ellipse and a reference, wherein the offset is indicative of an accuracy of a calibration of the X-Y scan head module.

6. The galvanometric laser system of claim 1, further comprising one or more processors coupled to the in-machine imaging system, the one or more processors configured to:
recognize a calibration feature in an image of the light-emissive calibration test piece, wherein the image is generated by the camera;
fit a pre-characterized pattern to the calibration feature to select a point in the image; and
determine an offset between the selected point and a reference, wherein the offset is indicative of an accuracy of the calibration of the X-Y scan head module.

7. The galvanometric laser system of claim 6, wherein the selected point comprises a line intersection of the pre-characterized pattern.

8. The galvanometric laser system of claim 6, wherein the selected point comprises a center of an ellipse or polygon of the pre-characterized pattern.

9. The galvanometric laser system of claim 1, wherein the light-emissive calibration test piece comprises a back-lit calibration test plate or an edge-lit calibration test plate.

10. The galvanometric laser system of claim 1, wherein the second region of the planar surface of the light-emissive calibration test piece comprises an optically transmissive part of the planar surface surrounded by an optically non-transmissive part of the planar surface.

11. A galvanometric laser system, comprising:
a laser device to generate a laser beam;
an X-Y scan head module to position the laser beam on a work piece, the X-Y scan head module including a laser ingress to receive the laser beam and a laser egress to output the laser beam;
a support platen located below the laser egress;
an in-machine imaging system integrated with the galvanometric laser system, wherein a camera of the in-machine imaging system is arranged to receive light of a selected wavelength from a surface of an object located on the support platen using one or more optical components of the X-Y scan head module to generate assessment data associated with a calibration of the X-Y scan head module by imaging the surface of the object, wherein the surface of the object includes a first region and a second region having greater light transmissibility or reflectivity in the selected wavelength than the first region in which a calibration fiducial located on the surface of the object is located in the second region.

12. The galvanometric laser system of claim 11, further comprising one or more processors coupled to the in-machine imaging system, the one or more processors configured to:
recognize a calibration feature in an image of the surface of the object, wherein the image is generated by the camera;
fit a pre-characterized pattern to the calibration feature to select a point in the image; and
determine an offset between the selected point and a reference, wherein the offset is indicative of an accuracy of the calibration of the X-Y scan head module.

13. The galvanometric laser system of claim 12, wherein the pre-characterized pattern comprises intersecting lines.

14. The galvanometric laser system of claim 11, wherein the calibration fiducial comprises a polygon or an ellipse.

15. The galvanometric laser system of claim 14, further comprising one or more processors coupled to the in-machine imaging system, the one or more processors configured to:
recognize a calibration feature in an image of the surface of the object, wherein the image is generated by the camera;
fit a polygon or an ellipse to the calibration feature; and
determine an offset between a center of the polygon or the ellipse and a reference, wherein the offset is indicative of an accuracy of the calibration of the X-Y scan head module.

16. The galvanometric laser system of claim 11, wherein the object comprises a laser processing target or a calibration test piece, and wherein the calibration fiducial comprises a transient calibration fiducial or a non-transient calibration fiducial, respectively.

17. The galvanometric laser system of claim 11, wherein the second region is arranged to reflect or emit light of the selected wavelength into the laser egress.

18. The galvanometric laser system of claim 11, wherein the second region comprises an optically transmissive part of the object surrounded by an optically non-transmissive part of the surface of the object.

19. The galvanometric laser system of claim 11, further comprising a selective optic located between the laser ingress and the laser device, the selective optic being optically transmissive to the laser beam and optically non-transmissive to the selected wavelength.

20. An apparatus, comprising:
a back-lit or edge lit calibration test piece to place on a support platen of a galvanometric laser system during a calibration routine prior to positioning a laser beam on a work piece, the light-emissive calibration test piece with a planar surface including a first region and a second region having greater light transmissibility than the first region in which a light-emissive calibration fiducial is located in the second region, the light-emissive calibration fiducial usable by an in-machine imaging system integrated with the galvanometric laser system to generate calibration data associated with a calibration of an X-Y scan head module of the galvanometric laser system.

* * * * *